Patented Mar. 27, 1951

2,546,456

UNITED STATES PATENT OFFICE 2,546,456

PROCESS FOR TREATING RICE

Richard W. Landon and Paul Talmey, Chicago, Ill., and Gregoire Gutzeit, East Chicago, Ind., assignors, by mesne assignments, to Milton Yonan-Malek, Washington, D. C.

No Drawing. Application December 9, 1948, Serial No. 64,422

2 Claims. (Cl. 99—80)

This invention relates to the processing of paddy rice by presently accepted methods for preserving the maximum nutrient values, especially the vitamin content originally contained in the rice bran, and has for a primary object a new and improved process of this kind.

It is a main object of this invention to provide a gelatinizing process for the treatment of paddy rice preparatory to milling, so that the final milled product has a much lighter color than heretofore obtainable in such processes.

It is a further object of this invention to provide such a preparatory process resulting in a mill yield in whole grains (fancy grade) higher than has been obtainable from the processes used heretofore.

It is a further object of this invention to provide a simplified process for producing a gelatinized kernel in the hulls ready for milling, whose characteristic color is light and pleasing to the housewife.

It is a further object of this invention to standardize such process of treating paddy rice so that such process can be employed on a commercial scale to produce uniform results at minimum costs.

Further objects, not specifically mentioned here, will be apparent from the detailed descriptions which follow.

Paddy rice, as herein referred to, is the raw material harvested from the fields and includes a thick, woody husk which has no food value insofar as human beings are concerned. Within this husk is the grain or kernel which has food value and which consists of three parts. First of these parts is the germ or embryo which is a small part of the kernel, the second is the starchy endosperm which constitutes the internal and major portion of the kernel and is surrounded by the third part or outer layers of the kernel including the pericarp or seed coat and the underlying aleurone layer.

The germ and outer layers comprise the rice bran and are removed from the endosperm in the milling of the paddy, usually in a milling step that follows the initial step of removing the husk. The rice bran is richer than the endosperm in certain nutrients and vitamins, and its removal from the endosperm results in a decrease in the nutrient value of the kernel.

The present invention is concerned with decreasing this nutrient loss by treatment of the paddy, preparatory to milling, in a process which includes gelatinization of the kernel, oftentimes referred to as parboiling. This gelatinization process not only improves the nutrient value of the milled kernels, but also improves the milling qualities of the paddy so that a higher yield of whole kernels is achieved.

There are today many well known processes for producing a good mill yield of gelatinized kernels from paddy rice, high in nutrient value and vitamin content. One of the general types of these processes consists mainly of soaking the paddy rice in water, parboiling the material to bring about gelatinization of the endosperm, drying the parboiled paddy, and finally milling the rice. There are wide ranges in these processes covering the length of soaking time and the temperature of the soaking water, the parboiling time and temperature, and the drying time and temperature. Some of these processes are carried out under atmospheric pressures, others under greater than atmospheric pressure, and still others in a vacuum. There is much prior art of which we are aware directed to specific ranges of time and temperature believed to represent optimum conditions for optimum results.

As far as most of the products of these processes are concerned, there is a satisfactory yield of good rice from both the nutrition and vitamin point of view as well as quantity of fancy head rice; however, there has been one drawback generally, and that is the color of the end product. This color varies from a pale amber to yellow verging on brown, as distinguished from the pale color of white rice commonly known as polished rice. There has also often been the problem of obtaining a uniform color in the end product. Actually this color is not a criterion of the quality of rice except for salability. It appears that the housewife is habituated to the apparent purity of white polished rice which has not been treated by any of the processes herein mentioned. This polished rice is actually inferior in vitamin and nutrient value, as stated above, but it is difficult to convince the retail customer of this fact, and yellow rice is therefore difficult to sell; consequently, a lighter color in the treated rice increases its commercial value. As far as mill yield of fancy head rice is concerned, it is axiomatic that any improvement is highly desirable.

We have discovered certain things about soaking, cooking and drying the paddy rice from which we have evolved definite principles to follow to procure an improved product not only from the standpoint of whole grain mill yield, but also from a standpoint of color. Summarizing briefly, the present invention teaches that the soaking step should insure enough water penetrating the hulls for subsequent complete gelatinization as well as determining what is the proper amount of water, that all surface water should then be drained off, and that the grain should then be exposed to heating for the shortest possible time to bring about gelatinization under conditions that add a minimum moisture. Finally the processed rice is dried by any proper method consistent with good drying practice to obtain a processed rice ready for milling, with a moisture content between 11 and 15%. Whenever moisture content is mentioned herein, the wet solids are used as the basis for computation of the percentage of moisture therein contained.

With reference first to the soaking process, the purpose of this step is to have the water enter through the hulls and penetrate into the endosperm. There must be a sufficient amount of water absorbed by the endosperm to insure substantially complete gelatinization, i. e. a moisture content from 20 to 30% on a wet basis. Our moisture tests are made by the Brown-Duvel method of measurement and are made after the excess water is drained from the rice paddy. The soaking process must be conducted so that there is a substantially even distribution of water among the grains as well as within the grains. Oversoaking is not desirable. There is a definite relationship between time of soaking and soaking temperature to insure optimum results (as indicated by percent gelatinization after steaming). Thus, it has been found that equivalent products can be obtained by soaking for five hours at 150° to 155° F., for seven hours at between 130° F. and 140° F., and for nine hours at between 120° and 130° F. The effect of temperature is shown by the following series, where a number of paddy rice samples were soaked for nine hours at different temperatures and processed (steamed) under identical conditions.

| Soaking Time | Soaking Temperature | Percent Processed [1] (Average of three Samples) |
| --- | --- | --- |
|  | °F. | Percent |
| 9 hours | 100 | 79.6 |
| 9 hours | 110 | 86.3 |
| 9 hours | 120 | [2] 91.3 |
| 9 hours | 130 | [3] 92.3 |

[1] Whenever mentioned herein, the phrase "percent processed" or "percent gelatinized" refers to the proportion of grains per one hundred that are substantially completely translucent.
[2] Lightest color.
[3] Very light.

Thus it will be seen that the higher the temperature, the shorter the time of soaking required for gelatinization; and with time fixed, the higher the temperature the higher the perentage of completion of the gelatinization, provided, however, that if this temperature is brought up to the point where gelatinization rapidly occurs, this is no longer true. Consequently it is preferable to have a longer soak than go to higher temperatures.

In combination with the succeeding steps of our process as hereinafter described, to attain the desired very light color of end product, we find that the best soaking conditions are in the ranges of time and temperature of from eleven hours at approximately 115° F. to fifteen hours at approximately 100° F. to get an adequate amount of water absorbed by the rice paddy to make it possible for the subsequent processing to produce an attractive light color combined with a yield of substantially 100% gelatinized whole grain rice. Variations within this range may be necessary to take care of the varietal difference in grains and growing conditions.

In the cooking or steaming part of the process, the desired action is gelatinization of the starchy endosperm which substantially constitutes the rice kernel itself. Without going into the complex chemical metamorphosis, suffice it to say that the water which has been properly soaked into the starch of the rice kernel at the proper temperature will, on the application of heat thereto, form a gel-like substance evidenced after drying by the semi-translucent appearance of the completely gelatinized rice kernel. If a kernel, when held up to the light shows a central portion that is not translucent, it is not completely gelatinized. Heretofore, different experts in the field have chosen varying times and temperatures as giving the best results. We have found through an exhaustive series of tests employing different times and temperatures of cooking the soaked rice material, that there is almost a straight line relationship between the time and temperature combinations required to obtain complete gelatinization; that is to say, gelatinization takes place in shorter times at higher temperatures and vice-versa. A close analysis and study of the results of these tests led to the discovery that if gelatinization alone is the goal, it is not too important what portion of the scale is selected. We found, however, that there is a zone of agreement for the product with a high percent of gelatinization having a light color when the mildest conditions (low temperatures and longer time, or short periods and higher temperatures) are employed.

Furthermore, we found that optimum results were obtained when little or no additional moisture was added during the heating process. Our preferred means of bringing this about is to drain off practically all the excess water and expose the soaked material to air for a limited time before dumping it into a closed vessel where it is exposed to vapor for a limited time. Surface water other than that actually absorbed within the hulls is extremely undesirable. The purpose of the air tempering is to permit the moisture soaked up by the hull to reach a balanced state or even dispersal throughout the entire hull. Thus the essence of our discovery is that if there is no excess surface or internal moisture in the rice paddy, and if the cooking process is limited to the shortest possible time in which a sufficiently high degree of gelatinization results, and if a minimum of moisture is added to the paddy during this cooking, the end product will contain the best characteristics by the standards of color, uniformity and vitamin content. By a sufficiently high degree of gelatinization we mean it is only necessary to come within the zone of a hundred percent gelatinization, and our findings indicate that this zone is much wider than heretofore realized. In other words, a satisfactory mill yield and a pleasingly light color are more dependent on the prevention of additional moisture content during the cooking process than on precise cooking time limits. This is a radical departure from previous ideas on the subject but has been verified by experiment and by test runs. Although conditions may require variation in steaming temperatures between 235 and 255° F., and in cooking time between five and fifteen minutes, our best results have been obtained by exposing the soaked material to steam vapor of a temperature of approximately 245° F.

for approximately six minutes. In test runs, at this time and temperature, we have consistently attained a 100% gelatinization and a uniform light color.

In order for the steamed paddy to be milled, it must be dried down to a low moisture content. Here it is obvious that the rice will be dried in a shorter time if done at a higher temperature, but, as is well known, good drying practice requires the avoidance of too high a drying heat or too long a drying time or too dry an atmosphere. To further and preserve the improvements in the product resulting from the controls, above described for the other two steps, the drying step must be a combination of a controlled humidity with the lowest possible temperature as well as the minimum drying time consistent with the final moisture content to be obtained (11 to 15%) for the best milling yield and color results.

The paddy thus processed contains a kernel which is gelatinized practically completely and is therefore harder and less brittle than unprocessed kernels. As a result, when milled in ordinary milling processes and apparatus, the yield of whole kernels (fancy grade) will be higher with the processed paddy than with unprocessed paddy. This gain in milling yield of whole kernels of nutrient enriched rice of good marketable color, renders the process particularly advantageous.

It must be understood that the conditions outlined above as applying to the steps of the treatment process are needed in combination with each other to carry out the teachings of the present invention for optimum results.

While we have chosen to illustrate our invention by describing a preferred embodiment of the steps of our improved process, we have done so by way of example only, as there are many modifications and adaptations which can be made by one skilled in the art within the teachings of the invention.

Having thus complied with the statutes, and shown and described a preferred embodiment of our invention, what we consider new and desire to have protected by Letters Patent is pointed out in the appended claims.

What is claimed is:

1. The method of preparing paddy rice for milling to produce a high yield of light colored nutrient enriched whole kernels for human consumption which comprises: soaking the paddy in an excess of water at approximately 125° F. for eleven hours at atmospheric pressure to cause it to absorb from 20 to 30% moisture on a wet basis; removing the paddy from the soaking water and removing the entrained water therefrom; steaming the paddy under pressure and at a temperature of approximately 235° F. to gelatinize the starch therein substantially without increase in the water content thereof; and drying the steamed paddy down to a moisture content of from 11 to 15% on a wet basis.

2. The method of treating paddy rice for subsequent milling to produce a high yield of substantially white nutrient enriched whole kernels which consists in soaking a predetermined batch of the paddy in an excess of water for substantially 11 hours at a temperature of substantially 125° F. and at atmospheric pressure; draining the soaking water from the batch and removing surface moisture therefrom; then subjecting the paddy while under pressure to steam at approximately 235° F. for a period of five to fifteen minutes to gelatinize the starch in the paddy substantially without increase in the water content thereof; and then drying the steamed paddy to a predetermined moisture content suitable for milling.

RICHARD W. LANDON.
PAUL TALMEY.
GREGOIRE GUTZEIT.

REFERENCES CITED

The following references are of record in the file of this patent:

UNITED STATES PATENTS

| Number | Name | Date |
|---|---|---|
| 2,334,665 | Yonan-Malek | Nov. 16, 1943 |
| 2,498,573 | Ozai-Durrani | Feb. 21, 1950 |

FOREIGN PATENTS

| Number | Country | Date |
|---|---|---|
| 339,014 | Great Britain | of 1929 |
| 493,528 | Great Britain | of 1938 |
| 494,085 | Great Britain | of 1937 |